US007497303B2

(12) United States Patent
Maccioni et al.

(10) Patent No.: US 7,497,303 B2
(45) Date of Patent: Mar. 3, 2009

(54) METHOD FOR SETTING THE PARAMETERS OF MOTOR CONTROL SYSTEMS OF HOISTING EQUIPMENT

(75) Inventors: Giorgio Maccioni, Witten (DE); Holger Freitag, Bochum (DE)

(73) Assignee: Demag Cranes & Components GmbH, Wetter (DE)

(*) Notice: Subject to any disclaimer, the term of this patent is extended or adjusted under 35 U.S.C. 154(b) by 678 days.

(21) Appl. No.: 10/906,015

(22) Filed: Jan. 31, 2005

(65) Prior Publication Data

US 2005/0167206 A1 Aug. 4, 2005

(30) Foreign Application Priority Data

Feb. 4, 2004 (DE) ....................... 10 2004 005 625

(51) Int. Cl.
*B66D 3/02* (2006.01)
*B66D 1/40* (2006.01)
*B66C 13/40* (2006.01)
*B60P 1/02* (2006.01)

(52) U.S. Cl. ....................... 187/391; 187/393; 414/496; 414/800

(58) Field of Classification Search ................. 187/391, 187/393; 414/496, 800; 212/284; 246/187 A, 246/187 B
See application file for complete search history.

(56) References Cited

U.S. PATENT DOCUMENTS

| | | | | |
|---|---|---|---|---|
| 4,570,543 | A * | 2/1986 | Ishikura et al. | 104/300 |
| 4,614,274 | A | 9/1986 | LaValle et al. | |
| 4,752,012 | A | 6/1988 | Juergens | 212/154 |
| 5,350,076 | A * | 9/1994 | Kalan | 212/315 |
| 5,437,432 | A * | 8/1995 | Fujikawa | 254/362 |
| 5,736,692 | A * | 4/1998 | Lumme et al. | 187/247 |
| 2003/0164349 | A1 | 9/2003 | Kohlenberg | |

FOREIGN PATENT DOCUMENTS

| | | | |
|---|---|---|---|
| DE | 3910718 | A1 | 10/1990 |
| EP | 0364994 | A1 | 10/1989 |
| EP | 0364994 | A1 | 4/1990 |
| JP | 02265896 | A | 10/1990 |
| JP | 2000026076 | A * | 1/2000 |

OTHER PUBLICATIONS

European Search Report completed May 19, 2005, from corresponding European Application No. EP 05 00 1757.

* cited by examiner

*Primary Examiner*—Walter Benson
*Assistant Examiner*—Eduardo Colon-Santana
(74) *Attorney, Agent, or Firm*—Van Dyke, Gardner, Linn & Burkhart, LLP

(57) ABSTRACT

A method for setting the parameters of electronic motor controls of hoisting equipment with a control mechanism (10) for the hoisting equipment with at least one hoisting switch (5), one lowering switch (6) and one emergency shutoff switch (4) and with a display (8) in which the following steps are preformed:(i) starting of the parameter setup mode,(ii) automatic, sequential run-through and display of all parameters, (iii) binary selection of a displayed parameter, if so desired, (iv) changing of the setting of the selected parameter, if so desired,(v) saving of the changes,(vi) termination of the parameter setup mode.

33 Claims, 3 Drawing Sheets

METHOD FOR SETTING THE PARAMETERS OF MOTOR CONTROL SYSTEMS OF HOISTING EQUIPMENT

BACKGROUND OF THE INVENTION

The invention is directed to a method for setting the parameters of motor control systems of hoisting equipment, especially hoisting equipment having cable and chain type pulley blocks.

For hoisting equipment with electronic motor controls, it is necessary to adjust the control parameters specific to the application and the customer. For example, in chain pulley blocks with electronic motor controls, the following parameters are adjusted to adapt the motor to the local circumstances:

Setting the direction of the hoisting mechanism in the case of right-hand rotation of the motor by changing the polarity, Adjusting the behavior of the electronic brake to a two or three phase braking process, Setting of one or two hoisting/lowering speeds, and the actual speed thereof, Interlocking of a master switch, Selection of a time or speed-triggered start, Monitoring speed for the speeds, Time filter for the speed monitoring.

It may further be desired to adjust the parameters relevant to the safety, such as the resetting of a fault counter.

Typically, a rewiring by means of plug-in patches, switch bays, and the like, is undertaken for this adjustment. However, this solution is not very variable and it requires large expense when placing the unit in service or changing the circumstances.

An adjustment by means of data interfaces is also known, using a parameterization terminal or PC or laptop computer. This, however, requires additional equipment, resulting in overhead costs and expenditure.

EP 0 364 994 A1 and U.S. Pat. No. 4,752,012 disclose electronic motor controls for cranes, in which the operating parameters are placed in a memory.

From Flender Loher: DYNAVERT® L brief instructions, version 11 October 2002, it is known how to sequentially run through the parameters and possibly change them when setting the parameters for drive rectifiers. A corresponding procedure is known from DE 39 107 18 A1 for motor protection devices.

SUMMARY OF THE INVENTION

The purpose of the invention is to provide a method for setting of parameters of electronic motor controls of hoisting equipment that can be carried out without additional accessories and that allows an easy setting of different parameters.

The purpose is accomplished with the method indicated in claim 1.

In a method according to an aspect of the invention, the parameters of electronic motor controls of hoisting equipment are set by:

(i) starting of a parameter setup mode, (ii) automatic, sequential run-through and display of all parameters, (iii) binary selection of a displayed parameter, if so desired, (iv) changing of the setting of the selected parameter, if so desired, (v) saving of the changes, (vi) termination of the parameter setup mode.

This procedure is carried out making use of the hoisting switch, the lowering switch, and the emergency shutoff switch usually present in hoisting equipment control mechanisms, in conjunction with the display for diagnostic purposes. No additional accessories are needed, such as extra switches, displays, or interfaces. Moreover, the method can be carried out with the microprocessor that is already present in the control system. No additional costly logic is needed. By "binary selection" is meant the choice between two predetermined possibilities. Specifically, this involves the selection of a parameter or a subparameter by activating a pushbutton. In particular, this may be the hoisting switch. The second possibility, here: deselection without change, is selected by activating a second pushbutton, in particular, the lowering switch. Thus, the hoisting switch has the meaning of positive selection or activation and the lowering switch accordingly a deselection or negative acknowledgement.

Therefore, by the binary selection of a displayed parameter or subsequently displayed subparameter, it is possible with the invented method to use the already available controller, yet still enable an easy and comprehensive adjustment.

The usual switches for hoisting and lowering most often have a two-stage design, i.e., in the first position they allow the selection of a first speed "V1" and in the second position the selection of a second speed "V2". The two-stage feature is usually determined by the strength of pressing or the depth of impression of the conventional pushbutton switches. To make sure that activation indeed occurs in the parameter setup mode, one can therefore specify that the switches or pushbuttons are only considered to be activated when they are activated to the extent that the second stage is triggered.

To allow for exiting the parameter setup mode at any time and the return to normal operating mode, the invention contemplates that the parameter setup mode can be exited or terminated at any time by activating the emergency shutoff switch, with saving of the changes made up to that point.

In order to allow for the selection or deselection of the displayed parameter or subparameter, the parameters may each be displayed one after the other for around 4 seconds, during which time a selection is possible by activating the hoisting switch. The same holds for the subparameters.

According to a detailed embodiment of the invention, at the start of the parameter setup mode in step (i), one can specify that the following steps have to be run through in sequence:

(a) Activating and holding of the emergency shutoff switch, (b) Activating and holding of the hoisting switch, and (c) Releasing of the emergency shutoff switch.

In addition, at the start of the parameter setup mode in step (i), one can run through the following steps after step (c):

(d) Display of the parameter setup mode, (e) Confirmation of the selection of the parameter setup mode, in particular, by releasing the hoisting switch, and (f) Display of the start of the parameter setup mode, if so desired.

In order to make sure that the parameter setup mode is in fact commenced, one can further provide that the activation (e) must occur during the display (d), which only occurs for a predetermined length of time (e.g., around 2 seconds). The displaying of the parameter setup mode can occur by displaying "P". Accordingly, the actual starting of the mode (f) can occur by displaying "o" for OK.

Advantageously, the following steps may be run through in step (iii):

(a) Activation of the hoisting switch to select a displayed parameter, or (b) Activation of the lowering switch to deselect the displayed parameter.

When the lowering switch is activated to deselect the displayed parameter (b), the next parameter is then displayed.

In one variant, the following steps are run through in step (iv):

(a) Activation of the hoisting switch to change a selected parameter, or (b) Activation of the lowering switch to deselect the selected parameter without change.

If subparameters are present in step (iv), one can run through the following steps in addition after step (a):

(c) Automatic sequential display of all subparameters, and (d) Binary selection of a displayed subparameter, if so desired, in order to change the setting of the selected parameter, by activation of the hoisting switch, or (e) Confirmation of the lowering switch to deselect a selected parameter without change.

Thus, the display and selection of the particular subparameters occurs similarly to the display and selection of the parameters. In order to announce the presentation of subparameters to the attending person, one can display "o" for "open" for around 2 seconds in step (iv)(c), before the actual subparameters are run through.

Preferably, after changing or deselecting the displayed parameter or subparameter in step (iv), one continues with the next parameter in step (ii). Thus, a simple and fast setting of all parameters is assured with the method of the invention, making use of a conventional controller.

As the display, one can use the one-place 7-segment display for diagnostic purposes, which is normally present and, therefore, does not have to be provided as an extra. The display can be arranged however desired, so long as it is visible to the attending person. Of course, it is also possible to use any other display, such as a multiple-place display, so as to display more than 10 parameters, for example.

In order to keep the display as simple as possible, it is advantageous to indicate the available parameters by single-place numbers, i.e., 0 to 9, and to indicate any subparameters available by a single letter, i.e., A, b, C, d, E, F, and so on. The choice of the symbols is done preferably to enable a good recognition on the single-place 7-segment display and thereby prevent mix-up.

In order to avoid wrong settings for safety-critical functions, which can have serious consequences, one can provide that the corresponding parameter is set only after activating of two parameters. Thus, for example, one must first activate the parameter 8 and then the parameter 9, each of them by positive selection using the hoisting switch, before the fault counter is erased or reset.

The parameters which can be set include all possible parameters. In particular, the following parameters are used: reverse direction of turning, 2 or 3-phase electronic braking, one or two hoisting/lowering speeds and the actual speed for each, interlocking of a master switch, time or speed-triggered start, monitoring speed of the speeds, time filter for the speed monitoring, and fault counter resetting.

These and other objects, advantages and features of this invention will become apparent upon review of the following specification in conjunction with the drawings.

BRIEF DESCRIPTION OF THE DRAWINGS

Additional features, details and benefits of the invention will result from the following description of the drawing.

DETAILED DESCRIPTION OF THE PREFERRED EMBODIMENT

Figure 1:
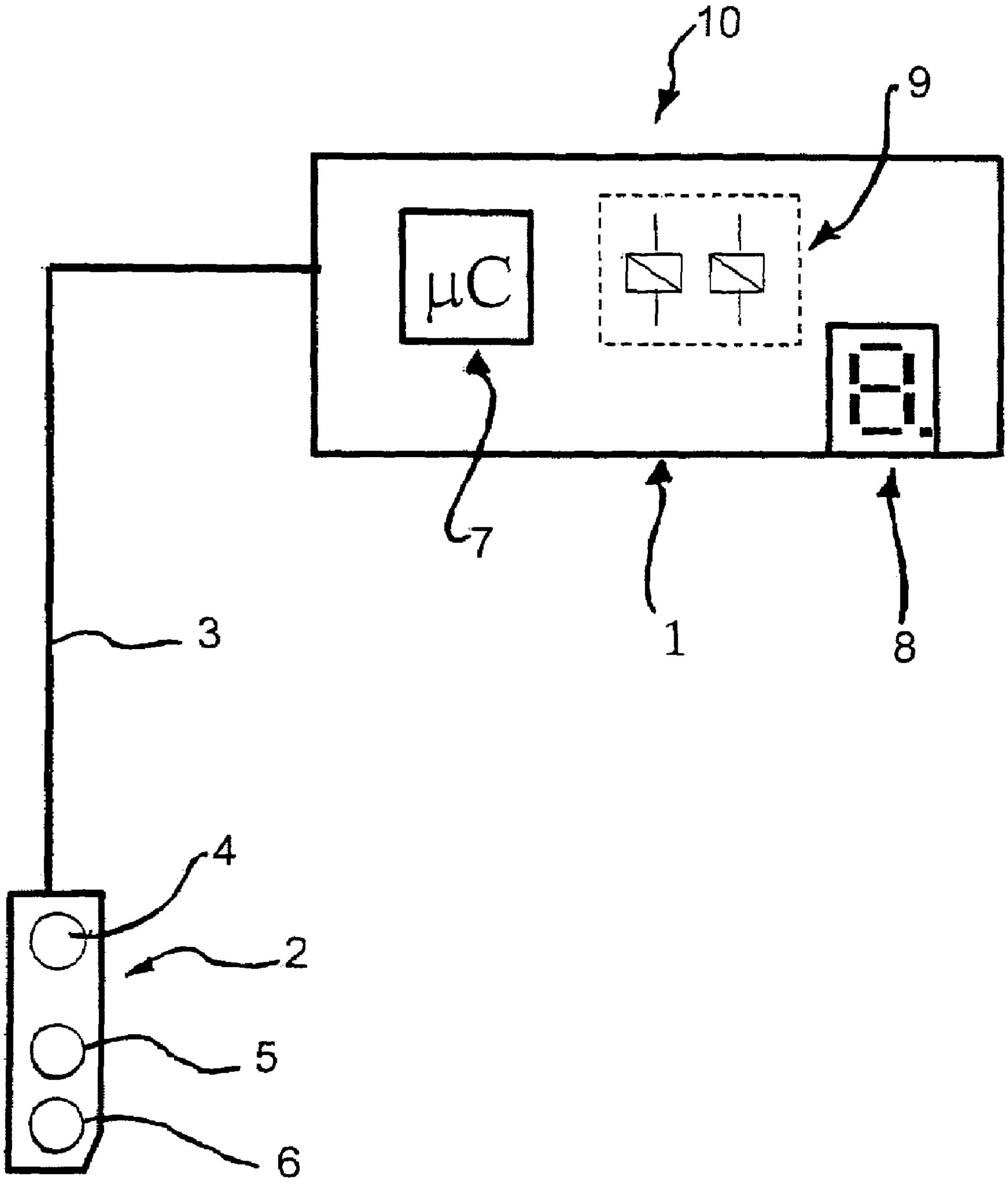
PRIOR ART Fig. 1
FIG. 1 is a block diagram of a conventional controller used to implement the method of the invention.
Figure 2:
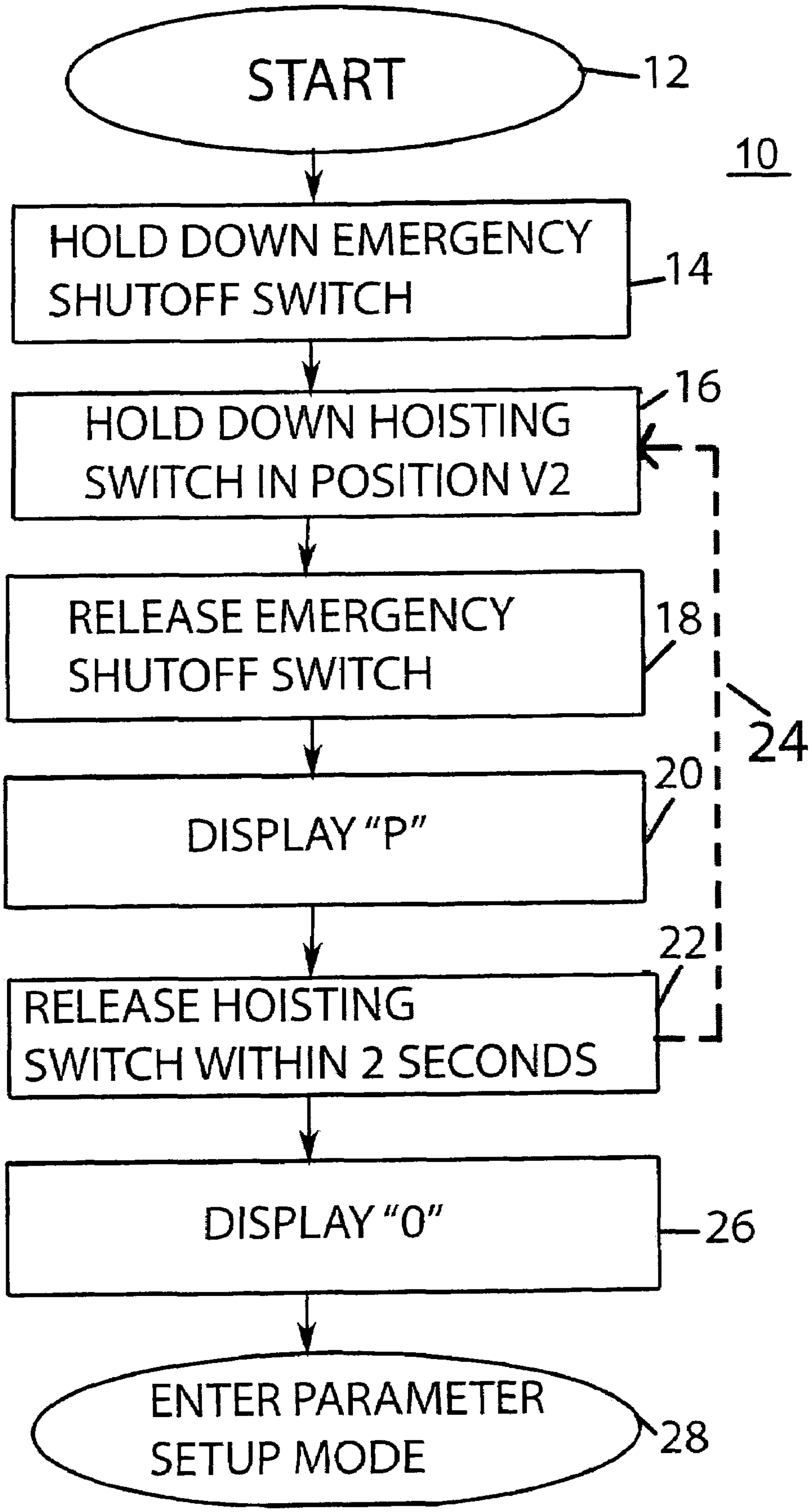
FIG. 2 is a flowchart of starting the parameter setup mode.
Figure 3:
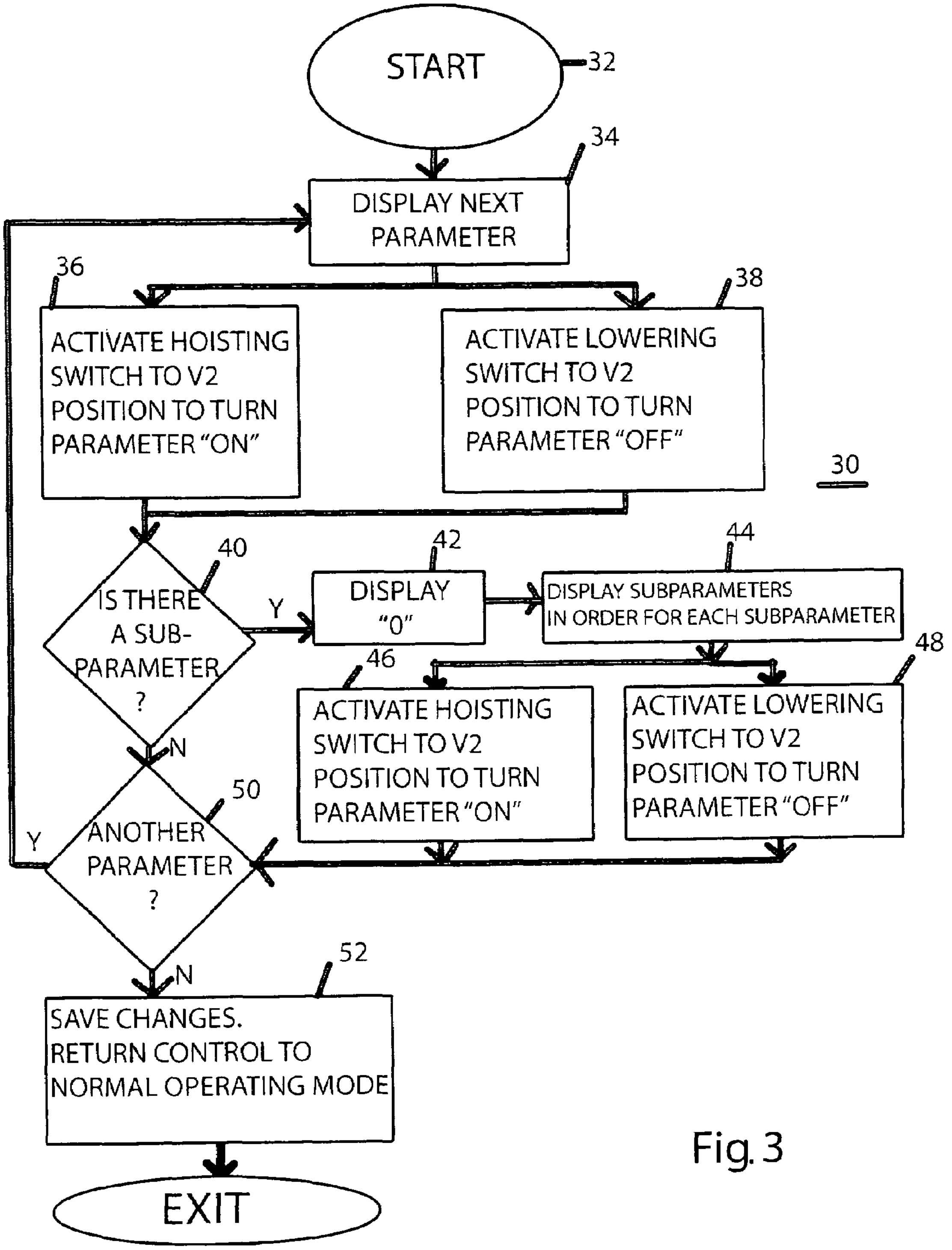
FIG. 3 is a flowchart of the parameter setup mode.

In the preferred embodiment, a control 1 comprises a microcontroller 7 for control and monitoring of the functions, in particular, the motor. For this, the microcontroller 7 is connected to it via a motor switch 9.

The control 1, moreover, features a display 8, which is provided for diagnostic purposes and is configured as a one-place 7-segment illuminated display. This is also used during the parameter setup mode in the context of the invented method for displaying the status or user instructions. The display 8 is arranged so that it is visible during attendance.

The manually activated operator's unit 2 comprises three switches or pushbutton switches. The emergency shutoff switch 4 for immediate shutoff in dangerous situations is used to start the parameter setup mode and also to terminate it at once. Arranged at a distance beneath this are the hoisting switch or pushbutton 5 and the lowering switch or pushbutton 6, which are usually marked with different arrow symbols, such as up or down pointing. The pushbutton 5, when activated, causes a lifting of the load by the corresponding motor control. Accordingly, the pushbutton 6 when activated causes a lowering of the load by a reverse motor control.

The pushbutton switches 5 and 6 are designed as two-stage pushbuttons, i.e., they possess two pressing points, which can be assigned to different hoisting/lowering speeds V1 and V2. Thus, by slight pressing, the smaller hoisting/lowering speed V1 can be selected, and the larger hoisting/lowering speed V2 by stronger pressing.

The sample embodiment of one variant of the invented method shall now be explained more closely by means of the use of the operator's unit 2.

At first, the parameter setup mode (10) has to be started (12). For this, the emergency shutoff switch 4 is first activated and held down (14). Next, the hoisting switch 5 is pressed and held in its position V2 (16). After this, the emergency shutoff switch 4 is released (18) and, after around 10 seconds, the display 8 shows "P" for parameter setup mode (20). The hoisting switch 5 is completely released before the display 8 goes out after around 2 seconds (22). If the display has already gone out, the hoisting switch 5 must again be pressed into its position V2 and held down (24). Finally, one must wait until the display 8 shows an "o" for okay (26), indicating that the parameter setup mode has been started (28).

The switches 4, 5 and 6 thus have the following meanings in the parameter setup mode, (30), in addition to their actual meaning in normal operation:

"Hoisting V2"=Yes or On

"Lowering V2"=No or Off

"Emergency shutoff"=Terminate parameter setup mode, saving the changes made up to that time.

If the parameter setup mode has been successfully activated (32), all available parameters are shown one after the other on the display 8 (34). This occurs by means of the digits "0" through "9", each of the digits representing one parameter.

The indicated digits or symbols may have the following meaning:

0 Reverse turning direction?

No (6): Standard (default)

Yes (5): reverse

1 Turn on 3-phase electronic braking?
No (6): 2-phase electronic brake, standard (default)
Yes (5): 3-phase electronic brake
2 Set only one hoisting/lowering speed?
No (6): turn on two hoisting/lowering speeds V1/V2, standard (default)
Yes (5): set only one hoisting/lowering speed V2
3 Set interlock of the operator's unit?
No (6): interlock operator's unit when several buttons are activated, standard (default)
Yes (5): if hoisting and lowering are activated, the first activated button takes priority
4 Set time-triggered motor start?
No (6): set speed-triggered start, standard (default)
Yes (5): set time-triggered start
5 Set monitoring speed V1?
No (6): use standard speed, e.g., 400 rpm, standard (default)
Yes (5): subparameters
A: 360 rpm
B: 320 rpm
C: 280 rpm
D: 240 rpm
E: 200 rpm
F: 160 rpm
6 Set monitoring speed V2?
No (6): use standard speed, e.g., 2400 rpm, standard (default)
Yes (5): display and select subparameters?
A: 2320 rpm
B: 2240 rpm
C: 2160 rpm
D: 2080 rpm
E: 2000 rpm
F: 1920 rpm
7 Set time filter for speed monitoring?
No (6): use standard time, e.g., 200 ms, standard (default)
Yes (5): subparameters
A: 100 ms
B: 150 ms
C: 250 ms
D: 300 ms
E: 250 ms
F: 400 ms
8 Activate first stage of "erase fault counter" function?
No (6): standard (default)
Yes (5): activate first stage
9 Activate second stage of "erase fault counter" function?
No (6): deactivate first stage, standard (default)
Yes (5): activate second stage and erase fault counter.

By activating the switch 5 in "Hoisting V2" position, the indicated parameter is selected, i.e., turned on (36), and, by activating the switch 6 in "Lowering V2" position, it is turned off (38). The selected action is acknowledged with "Y" for Yes or On, or "N" for No or Off. If no switch is activated, the parameter remains unchanged.

If the parameter selected has predetermined subparameters (40), an "o" for "OPEN" appears on the display 8 (42) and the corresponding subparameters are displayed one after the other (44) for selection by means of the symbols A, b, C, d, E, or F. Selection of the change or deselection occurs, once again, by activating switch 5 (46) or (48).

Thus, for example, to set the time filter for the speed monitoring to 250 ms, one proceeds as follows:

Display of "7" for 4 seconds
Activating of the hoisting switch 5 while "7" is being displayed
Display of "o" for 2 seconds, indicating availability of subparameters
Subsequent display of A for 4 seconds
Subsequent display of b for 4 seconds
Subsequent display of C for 4 seconds
Activating of the hoisting switch 5 while C is being displayed.

After the last parameter is reached or displayed (50), or when the emergency shutoff switch 4 is activated (not shown), the parameter setup mode is ended (52), changes are saved, and the control is switched to normal operating mode.

Changes and modifications in the specifically described embodiments can be carried out without departing from the principles of the invention which is intended to be limited only by the scope of the appended claims, as interpreted according to the principles of patent law including the doctrine of equivalents.

What is claimed is:

1. A method for setting the parameters of hoisting equipment, the hoisting equipment having a pulley block, a motor for selectively hoisting and lowering the pulley block, a microcontroller-based motor controller for controlling said motor and a hoist equipment operator unit operatively connected with said motor controller, said operator unit including a hoisting switch, a lowering switch and an emergency shutoff switch, said motor controller including a display, said method comprising:
the motor controller receiving user actuation of at least one of the hoisting switch, the lowering switch, and the emergency shutoff switch of the hoisting equipment operator unit in conjunction with the motor controller providing data to be displayed by the display to perform the steps of:
(i) starting a parameter setup mode,
(ii) sequentially running-through and displaying of all parameters,
(iii) receiving a selection of a displayed parameter,
(iv) receiving a change of the setting of the selected parameter,
(v) saving of the changes, and
(vi) terminating of the parameter setup mode;
wherein said starting the parameter setup mode comprises the following steps in sequence:
(a) activating and holding of the emergency shutoff switch,
(b) activating and holding of the hoisting switch or the lowering switch, and
(c) releasing of the emergency shutoff switch.

2. The method of claim 1, wherein said starting the parameter setup mode further includes the following steps in sequence:
(d) displaying of the parameter setup mode,
(e) confirming the selection of the parameter setup mode by releasing the hoisting switch or the lowering switch, and
(f) displaying of the start of the parameter setup mode.

3. The method of claim 2, wherein said receiving a selection of a displayed parameter further includes the following steps:
(a) activating one of the hoisting switch or the lowering switch to select a displayed parameter, or
(b) activating of the other of the hoisting switch or the lowering switch to deselect the displayed parameter.

4. The method of claim 3, wherein said receiving a change of the setting of the selected parameter further includes the following steps:
(a) activating one of the hoisting switch or the lowering switch to change a selected parameter, or
(b) activating of the other of the hoisting switch or the lowering switch to deselect the selected parameter without change.

5. The method of claim 4, wherein said receiving a change of the setting of the selected parameter further includes the following steps if subparameters are present:

(c) sequential displaying of all subparameters, and (d) receiving a selection of a displayed subparameter by activation of one of the hoisting switch or the lowering switch in order to change the setting of the selected subparameter, or (e) receiving a confirmation by activation of the other of the hoisting switch or the lowering switch to deselect a selected subparameter without change.

6. The method of claim 5, wherein said receiving a change of the setting of the selected subparameter includes receiving a next subparameter after changing or deselecting the displayed subparameter.

7. The method of claim 5, wherein the display comprises a single-digit 7-segment display.

8. The method of claim 7, including exiting said parameter setup mode at any time by activating the emergency shutoff switch, said exiting including saving of any changes made.

9. The method of claim 8, including activating functions critical to safety only after setting of at least two parameters.

10. The method of claim 9, wherein available parameters are displayed by a single-digit number.

11. The method of claim 9, wherein available subparameters are displayed by a single letter.

12. The method of claim 9, wherein the parameters being set are chosen from the group consisting of: reverse direction of turning, 2 or 3-phase electronic braking, one or two hoisting/lowering speeds and the actual speed for each, interlocking of a master switch, time or speed-triggered start, monitoring speed of the speeds, time filter for the speed monitoring, and fault counter resetting.

13. The method of claim 12, wherein at least one chosen from the hoisting switch and the lowering switch comprises a two-stage switch.

14. The method of claim 13, wherein the step of the receiving user actuation comprises placing the at least one chosen from the hoisting switch and the lowering switch at a second stage.

15. The method of claim 2, wherein said receiving a change of the setting of the selected parameter further includes the following steps:

(a) activating one of the hoisting switch or the lowering switch to change a selected parameter, or (b) activating of the other of the hoisting switch or the lowering switch to deselect the selected parameter without change.

16. The method of claim 15, wherein said receiving a change of the setting of the selected parameter further includes the following steps if subparameters are present:

(c) sequential displaying of all subparameters, and (d) receiving a se1ection of a displayed subparameter by activation of one of the hoisting switch or the lowering switch in order to change the setting of the selected subparameter, or (e) receiving a confirmation by activation of the other of the hoisting switch or the lowering switch to deselect a selected subparameter without change.

17. The method of claim 16, wherein said receiving a change of the setting of the selected subparameter includes receiving a next subparameter after changing or deselecting the displayed subparameter.

18. The method of claim 1, wherein said receiving a selection of a displayed parameter further includes the following steps:

(a) activating one of the hoisting switch or the lowering switch to select a displayed parameter, or (b) activating of the other of the hoisting switch or the lowering switch to deselect the displayed parameter.

19. The method of claim 1, wherein said receiving a selection of a displayed parameter further includes the following steps:

(a) activating one of the hoisting switch or the lowering switch to select a displayed parameter, or (b) activating of the other of the hoisting switch or the lowering switch to deselect the displayed parameter.

20. The method of claim 1, wherein said receiving a change of the setting of the selected parameter further includes the following steps:

(a) activating one of the hoisting switch or the lowering switch to change a selected parameter, or (b) activating of the other of the hoisting switch or the lowering switch to deselect the selected parameter without change.

21. The method of claim 20, wherein said receiving a change of the setting of the selected parameter further includes the following steps if subparameters are present:

(c) sequential displaying of all subparameters, and (d) receiving a selection of a displayed subparameter by activation of the hoisting switch in order to change the setting of the selected subparameter, or (e) receiving a confirmation by activation of the lowering switch to deselect a selected subparameter without change.

22. The method of claim 21,wherein said receiving a change of the setting of the selected subparameter includes receiving a next subparameter after changing or deselecting the displayed subparameter.

23. The method of claim 1, wherein said receiving a change of the setting of the selected parameter further includes the following steps:

(a) activating one of the hoisting switch or the lowering switch to change a selected parameter, or (b) activating of the other of the hoisting switch or the lowering switch to deselect the selected parameter without change.

24. The method of claim 23, wherein said receiving a change of the setting of the selected parameter further includes the following steps if subparameters are present:

(c) sequential displaying of all subparameters, and ( d) receiving a selection of a displayed subparameter by activation of one of the hoisting switch or the lowering switch in order to change the setting of the selected subparameter, or (e) receiving a confirmation by activation of the other of the hoisting switch or the lowering switch to deselect a selected subparameter without change.

25. The method of claim 24, wherein said receiving a change of the setting of the selected subparameter includes receiving a next subparameter after changing or deselecting the displayed subparameter.

26. The method of claim 24, wherein available subparameters are displayed by a single letter.

27. The method of claim 1, wherein the display comprises a single-digit 7-segment display.

28. The method of claim 1, including exiting said parameter setup mode at any time by activating the emergency shutoff switch, said exiting including saving of any changes made.

29. The method of claim 1, including activating functions critical to safety only after setting of at least two parameters.

30. The method of claim 1, wherein available parameters are displayed by a single-digit number.

31. The method of claim 1, wherein the parameters being set are chosen from the group consisting of: reverse direction of turning, 2 or 3-phase electronic braking, one or two hoisting/lowering speeds and the actual speed for each, interlock ing of a master switch, time or speed-triggered start, monitoring speed of the speeds, time filter for the speed monitoring, and fault counter resetting.

32. The method of claim 1, wherein at least one chosen from the hoisting switch and the lowering switch comprises a two-stage switch.

33. The method of claim 32, wherein the step of the receiving user activation comprises placing the at least one chosen from the hoisting switch and the lowering switch at a second stage.

* * * * *

UNITED STATES PATENT AND TRADEMARK OFFICE

CERTIFICATE OF CORRECTION

PATENT NO. : 7,497,303 B2
APPLICATION NO. : 10/906015
DATED : March 3, 2009
INVENTOR(S) : Giorgio Maccioni and Holger Freitag It is certified that error appears in the above-identified patent and that said Letters Patent is hereby corrected as shown below:

Column 4:
Line 52, Delete "," after "mode".

Column 5:
Line 60, Insert --6-- before "(48)".

Column 7:
Line 51, Claim 16, "se1ection" should be --selection--.

Column 8:
Line 26, Claim 22, "21,wherein" should be --21, wherein--.
Line 41, Claim 24, "( d)" should be --(d)--.

Signed and Sealed this

Twenty-eighth Day of April, 2009

JOHN DOLL
*Acting Director of the United States Patent and Trademark Office*